US012519383B2

(12) United States Patent
Ghotgalkar et al.

(10) Patent No.: US 12,519,383 B2
(45) Date of Patent: Jan. 6, 2026

(54) POWER CONVERTER CONTROLLER WITH FREQUENCY MONITORING

(71) Applicant: TEXAS INSTRUMENTS INCORPORATED, Dallas, TX (US)

(72) Inventors: Shailesh Ghotgalkar, Bengaluru (IN); Mihir Narendra Mody, Bengaluru (IN); Ashish Vanjari, Sugar Land, TX (US); Aravindhan Karuppiah, Bengaluru (IN); Mohd Farooqui, Bengaluru (IN); Biju Mg, Bengaluru (IN); Daniel Wu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 209 days.

(21) Appl. No.: 18/240,864

(22) Filed: Aug. 31, 2023

(65) Prior Publication Data
US 2025/0079967 A1 Mar. 6, 2025

(51) Int. Cl.
*H02M 3/335* (2006.01)
*H02M 1/00* (2006.01)
*H02M 3/00* (2006.01)
*H02M 1/14* (2006.01)

(52) U.S. Cl.
CPC .......... *H02M 1/0025* (2021.05); *H02M 3/01* (2021.05); *H02M 3/33515* (2013.01); *H02M 3/33571* (2021.05); *H02M 1/14* (2013.01)

(58) Field of Classification Search
CPC .. H02M 1/0025; H02M 3/01; H02M 3/33571; H02M 3/33515; H02M 1/14
See application file for complete search history.

(56) References Cited

U.S. PATENT DOCUMENTS

| 10,141,495 | B1* | 11/2018 | Nordquist ............. H10N 30/87 |
| 10,715,047 | B1 | 7/2020 | Chiu |
| 2016/0142078 | A1* | 5/2016 | Wang ................ H04L 25/03343 375/297 |
| 2016/0294284 | A1* | 10/2016 | Lerdworatawee .... H03F 1/0227 |
| 2017/0223632 | A1* | 8/2017 | Balteanu ................... H03F 1/56 |
| 2020/0195155 | A1 | 6/2020 | Colbeck |
| 2021/0036622 | A1 | 2/2021 | Brennan |
| 2021/0091654 | A1 | 3/2021 | Rajesh |

FOREIGN PATENT DOCUMENTS

CN 116191837 A 5/2023

OTHER PUBLICATIONS

PCT Search Report for PCT/US2024/044982 dated Jan. 7, 2025.

* cited by examiner

*Primary Examiner* — Alex Torres-Rivera
(74) *Attorney, Agent, or Firm* — Xianghui Huang; Frank D. Cimino

(57) ABSTRACT

A circuit includes a microcontroller having a first terminal and a second terminal. The microcontroller is configured to: receive a signal associated with operation of a power converter at the first terminal; adjust a switch control signal at the second terminal responsive to the signal; measure a frequency of the switch control signal; compare the measured frequency responsive to at least one envelope of a set of envelopes to obtain monitoring results; and perform control operations responsive to the monitoring results.

20 Claims, 5 Drawing Sheets

POWER CONVERTER CONTROLLER WITH FREQUENCY MONITORING

BACKGROUND

Switching converters are a type of power converter used to provide a direct-current (DC) output voltage ($V_{OUT}$) based on a DC input voltage ($V_{IN}$). A typical switching converter includes: a power stage with an energy storage device (e.g., an inductor and/or a capacitor) and switches to charge and discharge the energy storage device; and a controller for the switches of the power stage. Switching converter efficiency varies depending on proper management of switching control responsive to variations in $V_{IN}$, $V_{OUT}$, load, operating frequency, and inductor value. Mode transitions of the controller in response to load changes (e.g., light load to heavy load, or heavy load to light load), or input changes are common. If such mode transitions are not done in time, the switching converter may suffer from inefficient operation and/or undesirable $V_{OUT}$ ripple.

SUMMARY

In an example, a circuit includes a microcontroller having a first terminal and a second terminal. The microcontroller is configured to: receive a signal associated with operation of a power converter at the first terminal; adjust a switch control signal at the second terminal responsive to the signal; measure a frequency of the switch control signal; compare the measured frequency responsive to at least one envelope of a set of envelopes to obtain monitoring results; and perform control operations responsive to the monitoring results.

In another example, a microcontroller includes: a processor and a waveform analyzer in communication with the processor. The processor is configured to: receive a signal associated with operation of a power converter; and provide a switch control signal responsive to the signal. The waveform analyzer is configured to: measure a frequency of the switch control signal; and compare the measured frequency responsive to a set of envelopes that includes an inner envelope and an outer envelope to obtain monitoring results.

In yet another example, a system includes: a power converter; and a microcontroller coupled to the power converter. The microcontroller is configured to: receive a signal associated with operation of the power converter; adjust a switch control signal responsive to the signal; measure a frequency of the switch control signal; compare the measured frequency responsive to at least one envelope of a set of envelopes to obtain monitoring results; and perform control operations responsive to the monitoring results.

DETAILED DESCRIPTION

Figure 1:
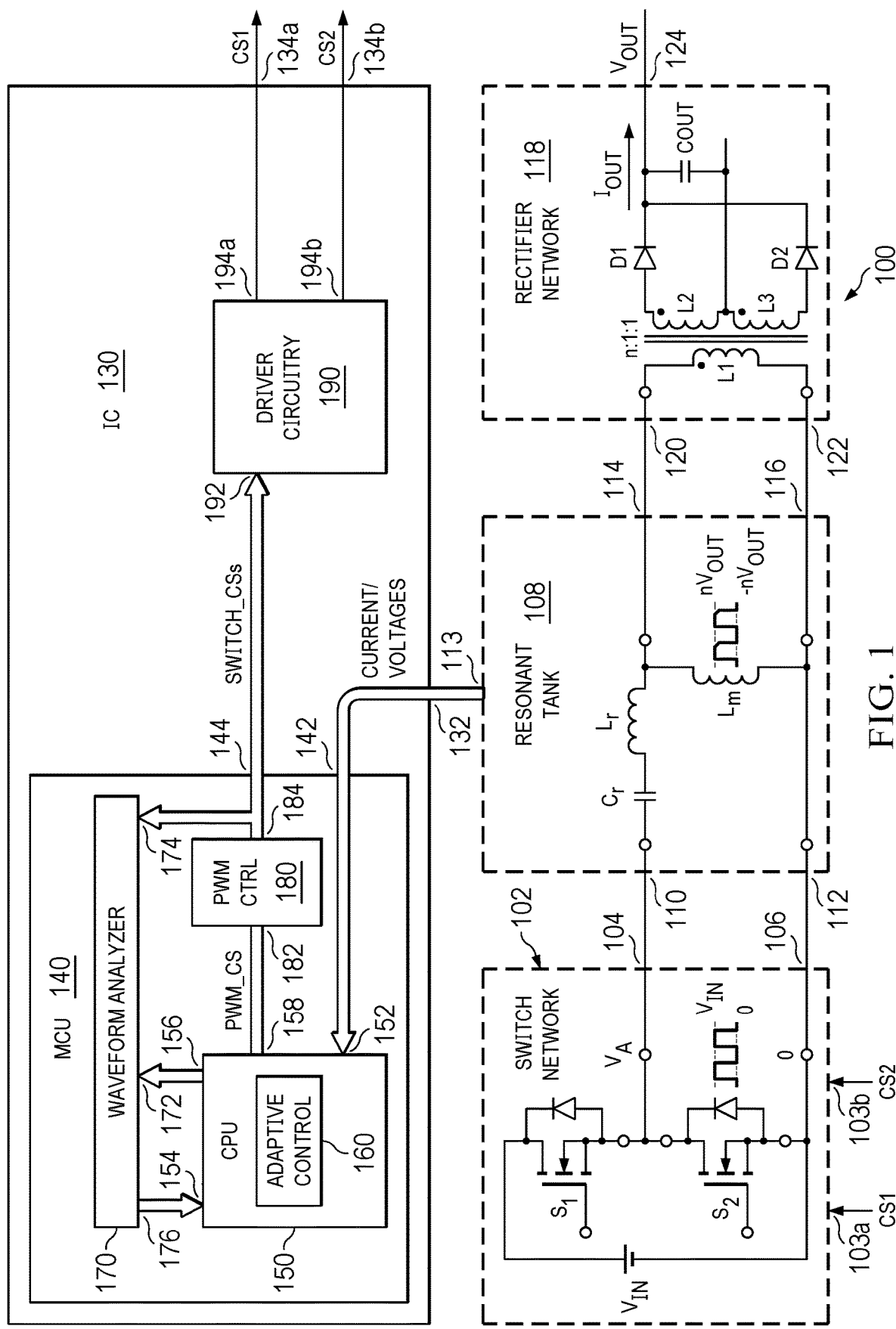
FIG. 1 is a diagram showing an example system.

The same reference numbers or other reference designators are used in the drawings to designate the same or similar features. Such features may be the same or similar either by function and/or structure.

FIG. 1 is a diagram showing an example system 100. In the example of FIG. 1, the system 100 includes an integrated circuit (IC) 130, a switch network 102, a resonant tank 108, and a rectifier network 118. In the example of FIG. 1, the switch network 102, the resonant tank 108, and the rectifier network 118 form a resonant converter and the IC 130 is a controller for the resonant converter. As shown, the IC 130 includes a microcontroller (MCU) 140 and driver circuitry 190. While the example of FIG. 1 describes a resonant converter and related control options provided by the IC 130, it should be appreciated that the control options of the IC 130 could be applied to other switching converters or power converters.

In the example of FIG. 1, the switch network 102 has first terminal 103a, a second terminal 103b, a third terminal 104, and a fourth terminal 106. In some examples, the switch network 102 includes a switch $S_1$, a switch $S_2$, and an input voltage ($V_{IN}$) supply in the arrangement shown. Without limitation, the switch $S_1$ may be referred to as a high-side (HS) switch, and the switch $S_2$ may be referred to as a low-side (LS) switch. As shown, the $V_{IN}$ supply has a first terminal and a second terminal. The switch $S_1$ has a first terminal, a second terminal, and a control terminal. The switch $S_2$ has a first terminal, a second terminal, and a control terminal. The first terminal of the switch $S_1$ is coupled to the first (e.g., positive) terminal of the $V_{IN}$ supply. The second terminal of the switch $S_1$ is coupled to the third terminal 104. The first terminal of the switch $S_2$ is also coupled to the third terminal 104. The second terminal of the switch $S_2$ is coupled to the fourth terminal 106. The control terminal of the switch $S_1$ is coupled to the first terminal 103a. The control terminal of the switch $S_2$ is coupled to the second terminal 103b. In other examples, the topology of the switch network 102 may vary.

The resonant tank 108 has a first terminal 110, a second terminal 112, a third terminal 113, a fourth terminal 114, and a fifth terminal 116. In some examples, the resonant tank 108 includes an energy storage device, which in the illustrated example includes: a capacitor $C_r$, a first inductor $L_r$, and a second inductor $L_m$ in the arrangement shown. The capacitor $C_r$ has a first terminal and a second terminal. The first inductor $L_r$ has a first terminal and a second terminal. The second inductor $L_m$ has a first terminal and a second terminal. In the example of FIG. 1, the first terminal of the capacitor $C_r$ s coupled to the first terminal 110 of the resonant tank 108. The second terminal of the capacitor $C_r$ is coupled to the first terminal of the first inductor $L_r$. The second terminal of the first inductor $L_r$ is coupled to the fourth terminal 114 of the resonant tank 108. The first terminal of the second inductor $L_m$ is coupled to the second terminal of the first inductor $L_r$ and to the fourth terminal 114 of the resonant tank 108. The second terminal of the second inductor $L_m$ is coupled to the second terminal 112 and the fifth terminal 116 of the resonant tank 108.

The rectifier network 118 has a first terminal 120, a second terminal 122, and a third terminal 124. In some examples, the rectifier network 118 includes a transformer (T1) having a primary coil L1, a first secondary coil L2, a second secondary coil L3, a first diode D1, a second diode D2, and an output capacitor (COUT) in the arrangement shown. The primary coil L1 has a first terminal and a second terminal. The first secondary coil L2 has a first terminal and a second terminal. The second secondary coil L3 has a first terminal and a second terminal. The first diode D1 has a first terminal (e.g., an anode terminal) and a second terminal (e.g., a cathode terminal). The second diode D2 has a first terminal (e.g., an anode terminal) and a second terminal (e.g., a cathode terminal). The capacitor COUT has a first terminal and a second terminal. The first terminal of the primary coil L1 is coupled to the first terminal 120 of the rectifier network 118. The second terminal of the first primary coil L1 is coupled to the second terminal 122 of the rectifier network 118. The first terminal of the first secondary coil L2 is coupled to the first terminal of the diode D1. The second terminal of the first secondary coil L2 is coupled to the first terminal of the third secondary coil L3 and to the second terminal of COUT. The second terminal of the first secondary coil L2 and the first terminal of the second secondary coil L3 may be coupled to a ground terminal (not shown). The second terminal of the third secondary coil L3 is coupled to the first terminal of the diode D2. The second terminals of the diodes D1 and D2 are coupled to the first terminal of COUT and to the third terminal 124 of the rectifier network 118.

The IC 130 has a first terminal 132, a second terminal 134a, and a third terminal 134b. In some examples where the IC 130 is disposed within a single package, each of the first terminal 132, second terminal 134a, and third terminal 134b corresponds to a discrete pin or set of pins of the package of the IC130, although any of the first terminal 132, second terminal 134a, and/or third terminal 134b may correspond to a shared pin that has more than one function. In some examples, the IC 130 includes the MCU 140 and the driver circuitry 190.

The MCU 140 has a first terminal 142 and a second terminal 144. The driver circuitry 190 has a first terminal 192, a second terminal 194a, and a third terminal 194b. In some examples where the MCU 140 is a discrete device disposed within in its own package, each of the first terminal 192, second terminal 194a, and third terminal 194b corresponds to a discrete pin or set of pins of the package of the MCU 140, although any of the first terminal 192, second terminal 194a, and/or third terminal 194b may correspond to a shared pin that has more than one function. In the example of FIG. 1, the MCU 140 includes central processor unit (CPU) 150, a waveform analyzer 170, and a PWM controller 180. In some examples, the MCU 140 may also include sense circuitry to process voltage and/or current sense signals associated with operation of a power converter. In different examples, the CPU 150 may include sense circuitry to process voltage and/or current sense signals and a hardware controller to determine switch control parameters (e.g., duty-cycle and period). The waveform analyzer 170 may include storage/register circuitry, frequency measurement circuitry, and compare circuitry. The PWM controller 180 may include on-time control circuitry and off-time control circuitry for each switch of the switch network 102.

As shown, the CPU 150 has first terminal 152, a second terminal 154, a third terminal 156, and a fourth terminal 158. In the example of FIG. 1, the CPU 150 includes adaptive control instructions 160. In other examples, the adaptive control instructions 160 may be replaced by adaptive control logic. The waveform analyzer 170 has a first terminal 172, a second terminal 174, and a third terminal 176. The PWM controller 180 has a first terminal 182 and a second terminal 184.

In the example of FIG. 1, the first terminal 132 of the IC 130 is coupled to the first terminal 142 of the MCU 140 and provides current/voltages from the resonant tank 108. The second terminal 144 of the MCU 140 is coupled to the first terminal 192 of the driver circuitry 190 and provides switch control signals (SWITCH_CSs). In different examples, the number of switches in the switch network 102 and the number of controls signals included with SWITCH_CSs may vary. For example, a half-bridge topology may include two switches as in FIG. 1. A full-bridge topology may include four switches. A three-phase full-bridge topology may include six switches. Other topologies are possible and may include additional switches and switch arrangements. The second terminal 194a of the driver circuitry 190 is coupled to the second terminal 134a of the IC 130 and provides a first control signal (CS1) for switch $S_1$. The third terminal 194b of the driver circuitry 190 is coupled to the third terminal 134b of the IC 130 and provides a second control signal (CS2) for switch $S_2$.

The first terminal 142 of the MCU 140 is also coupled to the first terminal 152 of the CPU 150. The second terminal 144 of the MCU 140 is coupled to the second terminal 184 of the PWM controller 180. The second terminal 184 of the PWM controller 180 is also coupled to the second terminal 174 of the waveform analyzer 170. The first terminal 182 of the PWM controller 180 is coupled to the fourth terminal 158 of the CPU 150. The second terminal 154 of the CPU 150 is coupled to the third terminal 176 of the waveform analyzer 170. The third terminal 156 of the CPU 150 is coupled to the first terminal 172 of the waveform analyzer 170.

As shown, the third terminal 104 of the switch network 102 is coupled to the first terminal 110 of the resonant tank 108. The fourth terminal 106 of the switch network 102 is coupled to the second terminal 112 of the resonant tank 108. The third terminal 113 of the resonant tank 108 is coupled to the first terminal 132 of the IC 130. The fourth terminal 114 of the resonant tank 108 is coupled to the first terminal 120 of the rectifier network 118. The fifth terminal 116 of the resonant tank 108 is coupled to the second terminal 122 of the rectifier network 118. The third terminal 124 of the rectifier network 118 is coupled to a load (not shown).

In operation, the IC 130 controls the switches (e.g., $S_1$ and $S_2$) of the switch network 102 to regulate VA provided to the resonant tank 108, resulting in $V_{OUT}$ and output current ($I_{OUT}$) regulation from the rectifier network 118 to a load (not shown). Specifically, the IC 130 is configured to: receive a current and/or voltage measurement from the resonant tank 108 at its first terminal 132; provide CS1 at its second terminal 134a responsive to the current and/or voltage measurement from the resonant tank 108, the operations of the MCU 140, the operations of the PWM controller 180, and the operations of the driver circuitry 190; and provide CS2 at its third terminal 134b responsive to the current and/or voltage measurement, the operations of the MCU 140, the operations of the PWM controller 180, and the operations of the driver circuitry 190.

The MCU 140 is configured to: receive the current and/or voltage measurement from the resonant tank 108; monitor a target frequency (e.g., the frequency of PWM_CS, SWITCH_CSs, CS1, or CS2) using the waveform analyzer 170; and adjust PMW_CS and/or SWITCH_CSs responsive to the current and/or voltage measurement from the resonant tank 108, target frequency monitoring results, and the operations of the CPU 150. In some examples, the CPU 150 is configured to adjust PWM_CS and/or SWITCH_CSs responsive to the target frequency monitoring results and the adaptive control instructions 160. In some examples, the waveform analyzer 170 uses a set of envelopes to monitor the target frequency such that the boundaries of envelopes of the set of envelopes vary based on mode of operation.

Example operations of the waveform analyzer 170 include: receiving a target signal (e.g., PWM_CS, SWITCH_CSs, CS1, or CS2); measuring a frequency of the target signal; comparing the measured frequency of the target signal responsive to or relative to a set of envelopes to obtain monitoring results; updating the frequency range of an inner envelope of the set of envelopes responsive to the monitoring results indicating frequency drift or predicted frequency drift beyond the inner envelope; providing updates/alerts to the CPU 150A responsive to monitoring results indicating frequency drift or predicted frequency drift beyond an outer envelope of the set of envelopes. In some examples, the adaptive control instructions 160 cause the CPU 150 to: establish frequency ranges for each envelope of the set of envelopes used by the waveform analyzer 170; receive the current and/or voltage measurement from the resonant tank; determine control loop results responsive to the received current and/or voltage measurement; selectively update PWM_CS, SWITCH_CSs, and a prediction filter responsive to the control loop results; perform mode change operations as needed; and perform safety operations responsive to the waveform analyzer 170 providing an envelope breach indication (e.g., when an outer envelope of the set of envelopes is breached).

In some examples, the waveform analyzer 170 may include storage/register circuitry and compare circuitry. In some examples, the storage/register circuitry may store a center frequency, an inner envelope offset relative to the center frequency, and an outer envelope offset relative to the center frequency. In other examples, the storage/register circuitry may store a center frequency count, an inner envelope offset count relative to the center frequency count, and an outer envelope offset count relative to the center frequency count. In other examples, the storage/register circuitry may store a minimum inner envelope frequency, a maximum inner envelope frequency, a minimum outer envelope frequency, and a maximum outer envelope frequency. In still other examples, the storage/register circuitry may store a minimum inner envelope frequency count, a maximum inner envelope frequency count, a minimum outer envelope frequency count, and a maximum outer envelope frequency count.

In some examples, the frequency measurement circuitry includes a time base (e.g., a clock signal) and an edge counter. In some examples, the frequency measurement circuitry may convert a count to an analog signal. In other examples, the frequency measurement circuitry may include an analog circuit having a constant current source, a capacitor, and switches to charge capacitor as a function of frequency. In such examples, the charge on the capacitor is an indication of frequency. As needed, switches and appropriate control signals may be used to reset the charge on the capacitor.

In some examples, the compare circuitry includes digital or analog comparators. A digital comparator may compare a count obtained by an edge counter with counts stored by the storage/register circuitry. In other examples, the compare circuitry may include analog comparators such as: a first analog comparator; a second analog comparator; a third analog comparator; and a fourth analog comparator. In such examples, the compare circuitry may receive a first reference voltage to the first analog comparator, a second reference voltage for the second analog comparator, a third reference voltage for the third analog comparator, and a fourth reference voltage for the fourth analog comparator. The first reference voltage indicates a minimum inner envelope frequency. The second reference voltage indicates a maximum inner envelope frequency. The third reference voltage indicates a minimum outer envelope frequency. The fourth reference voltage indicates a maximum outer envelope frequency.

During operations of the switch network 102, the resonant tank 108, and the rectifier network 118: variations in $V_{IN}$, $V_{OUT}$, load, operating frequency, and the inductance of $L_r$ and/or $L_m$ affects power converter efficiency. To account for such variations, the MCU 140 uses the CPU 150, the waveform analyzer 170, and the PWM controller 180 to adjust PWM_CS and/or SWITCH CSs responsive to the current and/or voltage measurement from the resonant tank 108, the monitored target frequency results, and the adaptive control instructions 160. In different scenarios, the IC 130 is configured to adjust PWM_CS and/or SWITCH CSs to account for mode changes, load changes (e.g., light load to heavy load, or heavy load to light load), a target efficiency, and/or a target $V_{OUT}$ ripple.

While the system 100 describes a resonant converter scenario, other example systems may include a switching converter or other power converter instead of a resonant converter. A resonant converter is an example of a switching converter, but a switching converter is not limited to a resonant converter. Other example switching converters include buck converters, boost converters, and buck-boost converters. In some examples, a system includes: a power converter; and a MCU (e.g., the MCU 140 in FIG. 1) coupled to power converter and configured to: receive a signal (e.g., the sense signals described herein) associated with operation of the power converter; adjust a switch control signal responsive to the signal; measure a frequency of the switch control signal; compare the measured frequency responsive to at least one envelope of a set of envelopes to obtain monitoring results; and perform control operations responsive to the monitoring results.

In some examples, the MCU is configured to adjust the switch control signals responsive to a first control loop and a second control loop, the second control loop responsive to the monitoring results, and the first control loop responsive to the sense signals and slower than the second control loop. In some examples, the power converter is a resonant converter, the MCU is configured to predict a resonant converter gain trajectory responsive to the monitoring results, and the control operations are based on the predicted resonant converter gain trajectory.

Figure 2:
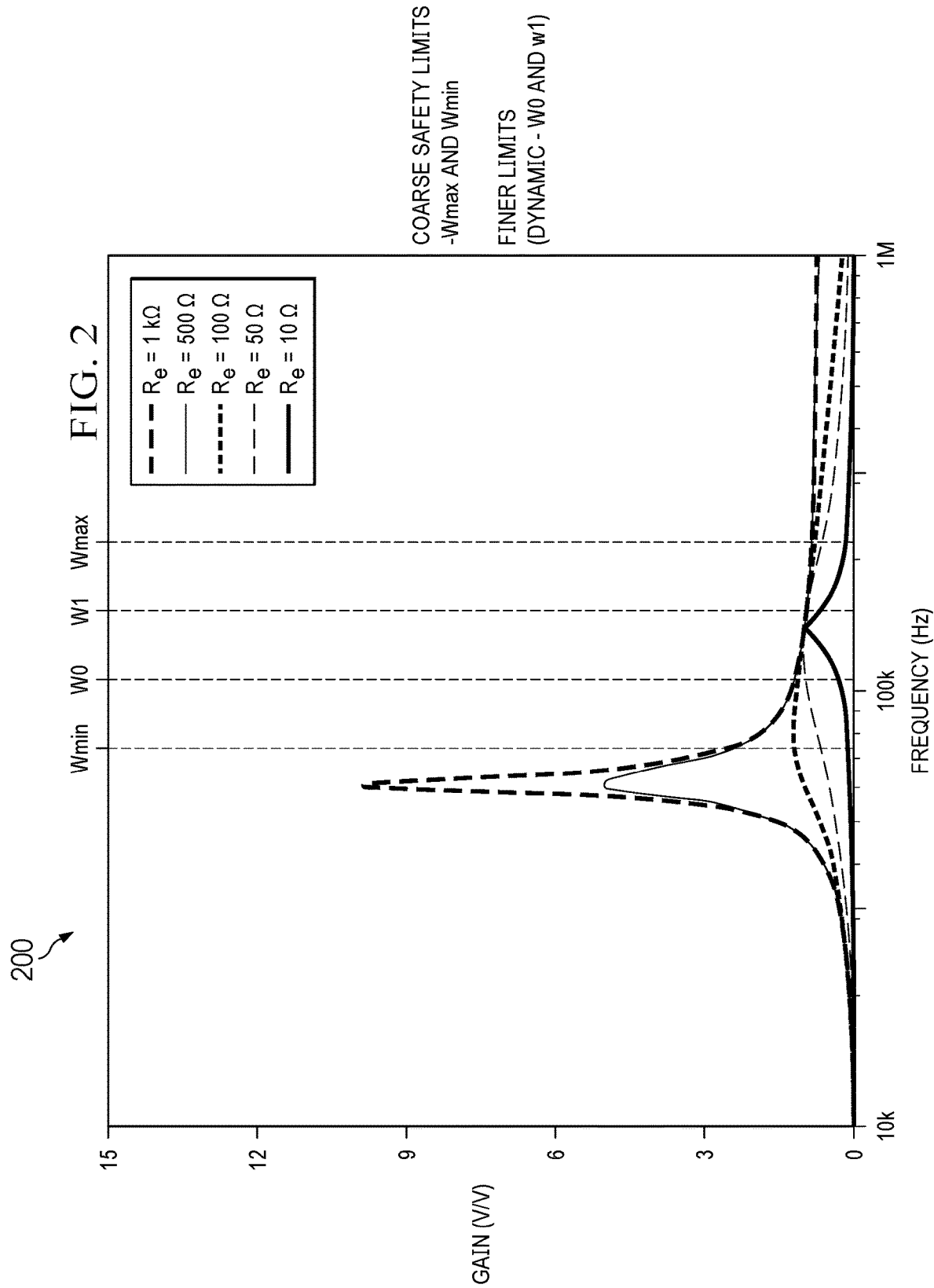
FIG. 2 is a graph showing gain as a function of frequency for a resonant converter.

FIG. 2 is a graph 200 showing gain as a function of frequency for an example resonant converter. As shown in graph 200, the gain of the resonant converter may vary depending on the effective resistance (Re) of the resonant converter. For different Re values, the center frequency and frequency range of a resonant converter varies. Over time, the operational frequency of a resonant converter may shift due to variances in $V_{IN}$, $V_{OUT}$, load, operating frequency, and the inductance of $L_r$ and/or $L_m$. In different examples, monitoring operations may involve monitoring the frequency of PWM_CS, SWITCH_CSs, CS1, or CS2, or related signals. In some examples, a set of envelopes is used to monitor the operational frequency of a resonant converter. In graph 200, the set of envelopes includes an inner envelope and an outer envelope. The inner envelope is formed using inner envelope thresholds, W0 and W1. The outer envelope is formed using inner envelope thresholds $W_{min}$ and $W_{max}$.

In the described embodiments, adaptive control operations for a resonant converter involve monitoring a target frequency (e.g., the frequency of PWM_CS, SWITCH_CSs, CS1, or CS2) using the set of envelopes. In response to frequency drift relative to the set of envelopes, the adaptive control operations may adjust PWM_CS, SWITCH_CSs, the resonant converter mode, parameters of the set of envelopes, and/or other control options.

Figure 3:
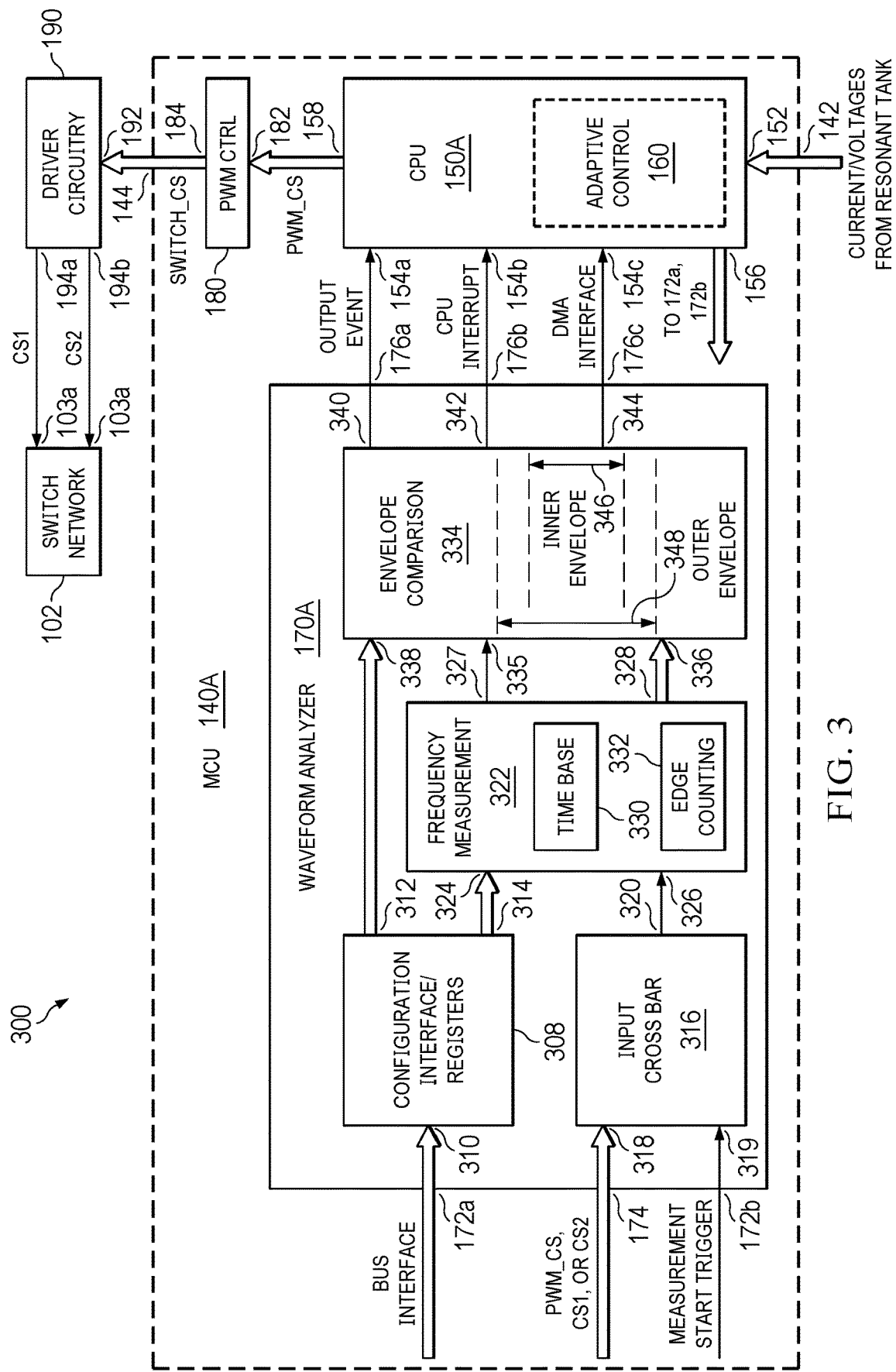
FIG. 3 is a block diagram showing an example microcontroller (MCU).

FIG. 3 is a block diagram 300 showing an example MCU 140A. The MCU 140A is an example of the MCU 140 of FIG. 1. As shown, the block diagram 300 also includes the switch network 102 and the driver circuitry 190 described in FIG. 1. In the example of FIG. 3, the MCU 140A includes a CPU 150A, a waveform analyzer 170A, and the PWM controller 180. The CPU 150A is an example of the CPU 150 in FIG. 1. The waveform analyzer 170A is an example of the waveform analyzer 170 in FIG. 1.

As shown, the MCU 140A has the first terminal 142 and the second terminal 144 described in FIG. 1. The CPU 150A has the first terminal 152, a second terminal 154a, a second terminal 154b, a second terminal 154c, a third terminal 156, and a fourth terminal 158. In examples, the second terminals 154a, 154b, and 154c are examples of the second terminal 154 in FIG. 1. In the example of FIG. 3, the CPU 150A includes the adaptive control instructions 160 described in FIG. 1. In other examples, the CPU 150A may include adaptive control logic instead of the adaptive control instructions 160 to perform the same or similar operations.

As shown, the waveform analyzer 170A has a first terminal 172a, a first terminal 172b, a second terminal 174, a third terminal 176a, a third terminal 176b, and a third terminal 176c. In the example of FIG. 3, the waveform analyzer 170A includes a configuration interface/registers circuit 308, input cross bar circuitry 316, frequency measurement circuitry 322, and envelope comparison circuitry 334. The configuration interface/registers circuit 308 has a first terminal 310, a second terminal 312, and a third terminal 314. The input cross bar circuitry 316 has a first terminal 318, a second terminal 319, and a third terminal 320. The frequency measurement circuitry 322 has a first terminal 324, a second terminal 326, a third terminal 327, and a fourth terminal 328. In some examples, the frequency measurement circuitry 322 includes time base circuitry 330 and edge counting circuitry 332. The envelope comparison circuitry 334 has a first terminal 335, a second terminal 336, a third terminal 338, a fourth terminal 340, a fifth terminal 342, and a sixth terminal 344. In the example of FIG. 3, configuration interface/registers circuit 308 is an example of the storage/registers circuit described in FIG. 1, and the frequency measurement circuitry 322.

As shown, the first terminal 142 of the MCU 140A is coupled to the first terminal 152 of the CPU 150A. The second terminal 144 of the MCU 140A is coupled to the second terminal 184 of the PWM controller 180. The first terminal 182 of the PWM controller 180 is coupled to the fourth terminal 158 of the CPU 150A. The second terminal 154a of the CPU 150A is coupled to the third terminal 176a of the waveform analyzer 170A. The second terminal 154b of the CPU 150A is coupled to the third terminal 176b of the waveform analyzer 170A. The second terminal 154c of the CPU 150A is coupled to the third terminal 176c of the waveform analyzer 170A. The third terminal 156 of the CPU 150A is coupled to the first terminals 172a and 172b of the waveform analyzer 170A. In some examples, the second terminal 174 of the waveform analyzer 170A is coupled to fourth terminal 158 of the CPU 150A. In other examples, the second terminal 174 of the waveform analyzer 170A is coupled to the second terminal 194a and/or the third terminal 194b of the driver circuitry 190.

In the example of FIG. 3, the first terminal 172a of the waveform analyzer 170A is coupled to the first terminal 310 of the configuration interface/registers circuit 308. The first terminal 172b of the waveform analyzer 170A is coupled to the second terminal 319 of the input cross bar circuitry 316. The second terminal 174 of the waveform analyzer 170A is coupled to the first terminal 318 of the input cross bar circuitry 316. The third terminal 176a of the waveform analyzer 170A is coupled to the fourth terminal 340 of the envelope comparison circuitry 334. The third terminal 176b of the waveform analyzer 170A is coupled to the fifth terminal 342 of the envelope comparison circuitry 334. The third terminal 176c of the waveform analyzer 170A is coupled to the sixth terminal 344 of the envelope comparison circuitry 334.

The second terminal 312 of the configuration interface/registers circuit 308 is coupled to the third terminal 338 of the envelope comparison circuitry 334. The third terminal 314 of the configuration interface/registers circuit 308 is coupled to the first terminal 324 of the frequency measurement circuitry 322. The third terminal 320 of the input cross bar circuitry 316 is coupled to the second terminal 326 of the frequency measurement circuitry 322. The third terminal 327 of the frequency measurement circuitry 322 is coupled to the first terminal 335 of the envelope comparison circuitry 334. The fourth terminal 328 of the frequency measurement circuitry 322 is coupled to the second terminal 336 of the envelope comparison circuitry 334.

In operation, the MCU 140A is configured to: receive the current and/or voltage measurement from a resonant tank (e.g., the resonant tank 108 in FIG. 1); monitor a target frequency (e.g., the frequency of PWM_CS, SWITCH_CSs, CS1, or CS2) using the waveform analyzer 170A; and adjust PWM_CS and/or SWITCH_CSs responsive to the current and/or voltage measurement from the resonant tank, target frequency monitoring results, and the operations of the CPU 150A. In some examples, the CPU 150A is configured to adjust PWM_CS and/or SWITCH_CSs responsive to the target frequency monitoring results and the adaptive control instructions 160. In some examples, the waveform analyzer 170 uses a set of envelopes to monitor the target frequency. The set of envelopes may include an inner envelope 346 and an outer envelope 348, where the frequency range of the inner envelope 346 is within the frequency range of the outer envelope 348.

Example operations of the waveform analyzer 170A include: receiving a target signal (e.g., PWM_CS, SWITCH_CSs, CS1, or CS2); using the frequency measurement circuitry 322 to determine a frequency of the target signal; using the envelope comparison circuitry 334 to compare the determined frequency responsive to at least one envelope of a set of envelopes to obtain monitoring results; updating the frequency range of an inner envelope of the set of envelopes responsive to the monitoring results indicating frequency drift or predicted frequency drift beyond the inner envelope; providing updates/alerts to the CPU 150A responsive to monitoring results indicating frequency drift or predicted frequency drift beyond an outer envelope of the set of envelopes. In some examples, the CPU 150A is configured to: receive the current and/or voltage measurement from a resonant tank; establish inner and outer frequency ranges for the set of envelopes used by the waveform analyzer 170A; determine control loop results responsive to the received current and/or voltage measurement and the adaptive control instructions 160; selectively update PWM_CS and/or SWITCH_CSs and a prediction filter responsive to the control loop results; perform mode change operations as needed responsive to the control loop results, the adaptive control instructions 160, and monitoring results from the waveform analyzer 170A; and perform safety operations responsive to the waveform analyzer 170A providing an outer envelope breach indication.

In some examples, MCU (e.g., the MCU 140 in FIG. 1, or the MCU 140A in FIG. 3) includes an CPU, a waveform analyzer, and a PWM controller. The CPU is configured to: receive sense signals; and provide a PWM control signal responsive to the sense signals. In some examples, the waveform analyzer is in communication with the CPU and is configured to: measure a frequency of the PWM control signal; and monitor the measured frequency responsive to at least one envelope of a set of envelopes having an inner envelope and an outer envelope to obtain monitoring results.

In some examples, the CPU is configured to adjust the PWM control signal responsive to a first control loop and a second control loop, the second control loop responsive to the monitoring results, and the first control loop responsive to the sense signals and slower than the second control loop. In some examples, the waveform analyzer is configured to update or shift the inner envelope without intervention of the microcontroller responsive to the monitoring results.

In some examples, the waveform analyzer is configured to: detect whether a frequency drift is greater than a threshold responsive to the monitoring results; and generate the DMA request responsive to the detected frequency drift being greater than the threshold. In some examples, the waveform analyzer is configured to generate an interrupt to the CPU responsive to the monitoring results. In some examples, the CPU is configured to program frequency ranges of the inner and outer envelopes. In some examples, the waveform analyzer is configured to: perform a first control operation responsive to the monitoring results indicating a breach of the inner envelope by the measured frequency outside; and a second control operation responsive to the monitoring results indicating a breach of the outer envelope by the measured frequency. In some examples, the waveform analyzer is configured to: predict a resonant converter gain trajectory responsive to the monitoring results; and perform control operations responsive to the predicted resonant converter gain trajectory.

Figure 4:
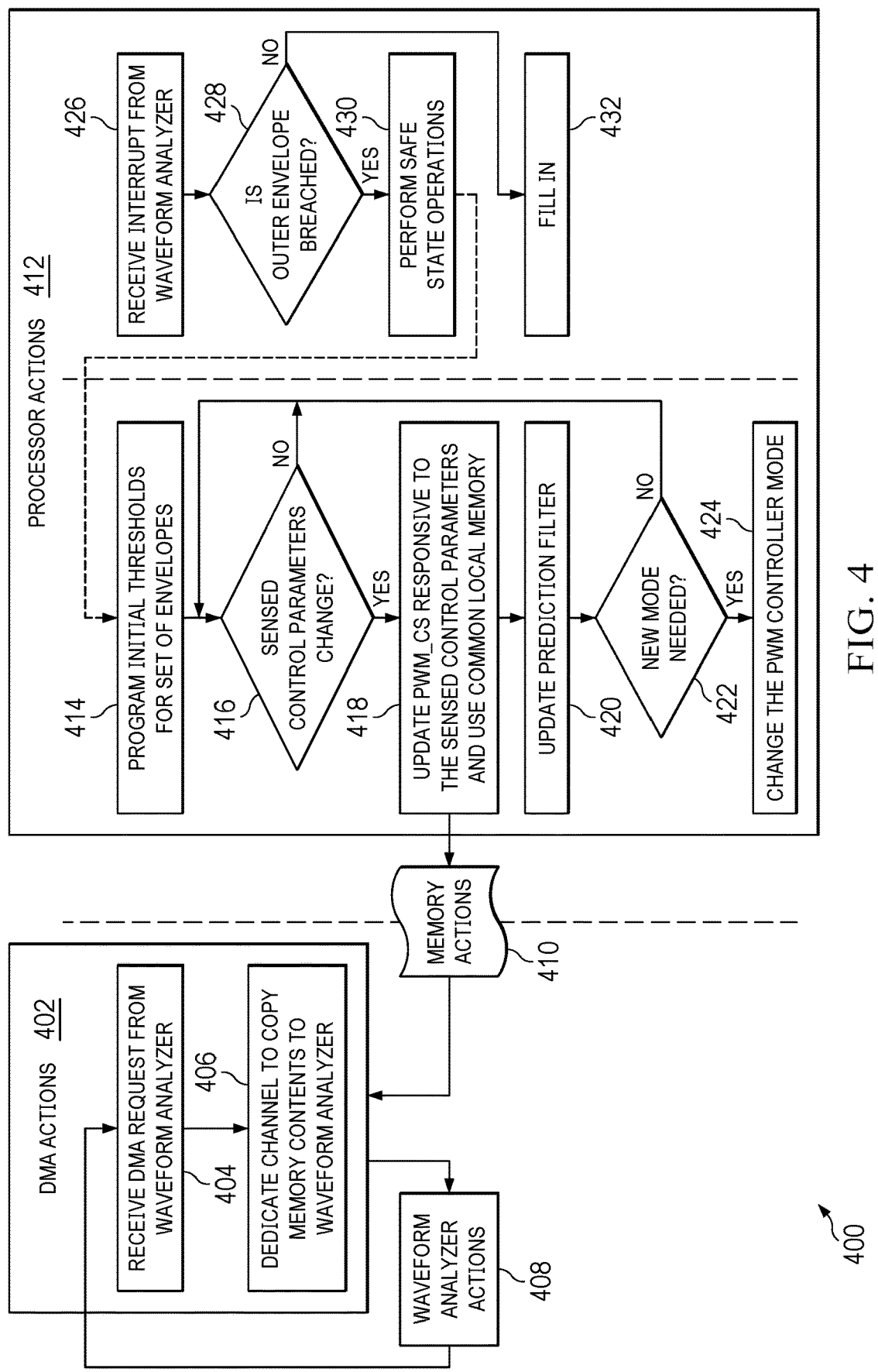
FIG. 4 is a flowchart showing an example MCU method.

FIG. 4 is a flowchart showing an example MCU method 400. The MCU method 400 includes direct memory access (DMA) actions 402, waveform analyzer actions 408, memory actions 410, and processor (e.g., CPU) actions 412. In some examples, the DMA actions 402 include receiving a DMA request from the waveform analyzer at block 404. At block 406, a channel is dedicated to copy memory contents to the waveform analyzer. In some examples, the waveform analyzer actions 408 include: receiving a target signal; determining a frequency of the target signal; monitoring the frequency of the target signal relative to at least one envelope of a set of envelopes; adjusting a frequency range of an inner envelope of the set of envelopes responsive to the monitoring results indicating frequency drift or predicted frequency drift beyond the inner envelope; providing updates/alerts to the processor via the DMA actions 402 responsive to monitoring results indicating frequency drift or predicted frequency drift beyond an outer envelope of the set of envelopes.

In some examples, the processor actions 412 include programming initial threshold and envelope values for the set of envelopes at block 414. If sensed control parameters change (block 416), PWM_CS and/or SWITCH_CSs is updated responsive to the sensed control parameters and common local memory is used at block 418. If sensed control parameters do not change (block 416), the method 400 stays at block 416. In some examples, the sensed control parameters include an output current, an output voltage, an input voltage, and/or an input current associated with switch network 102, resonant tank 108, and rectifier network 118. At block 420, a prediction filter is updated responsive to the updated PWM_CS and/or SWITCH_CSs and the sensed control parameters. If a new mode is needed (block 422), the PWM controller mode is changed at block 422. In some examples, the PWM controller modes may include: moving to another resonant frequency or gain setting; or moving to a diode emulation setting at lower loads.

In some examples, the waveform analyzer actions 408 include generating an interrupt responsive to frequency monitoring relative to the set of envelopes. In such case, the processor actions 412 include receiving an interrupt from the waveform analyzer at block 426. If the outer envelope is breached (block 428), safe state operations are performed at block 430. Example safe state operations may include forcing PWM outputs to a fixed value that is a safe value for the power stage and/or providing a fixed PWM sequence to run the power stage in limp mode. If the outer envelope is not breached (block 428), the method 400 includes registering an inner envelope breach in the prediction module and revising the inner envelop settings to track a next frequency range at block 432. During the method 400, the memory actions 410 may include copying new envelope settings to the waveform analyzer via DMA operations.

Figure 5:
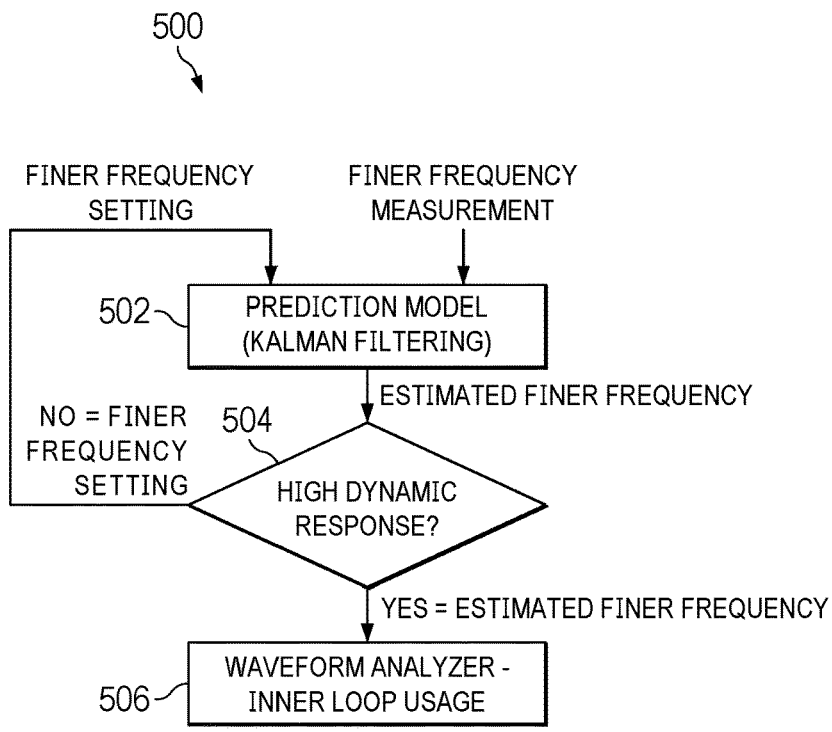
FIG. 5 is a flowchart showing example control operations of an MCU.

FIG. 5 is a flowchart showing example control operations 500 of an MCU (e.g., the MCU 140 in FIG. 1, or the MCU 140A in FIG. 3). In the example of FIG. 5, the control operations 500 include providing a finer frequency setting and a finer frequency measurement to a prediction model 502. In some examples, the prediction model is based on Kalman filtering. The prediction model 502 outputs a measured finer frequency responsive to the finer frequency setting and the finer frequency measurement. If there is a high dynamic response (block 504), the measured finer frequency determined by the prediction model 502 is provided to a waveform analyzer inner loop 506. Also, the processor is interrupted to update control to a different mode. Otherwise, if there is a not high dynamic response (block 504), the finer frequency setting is provided to the waveform analyzer inner envelope setting to detect a next breach at block 506.

Figure 6:
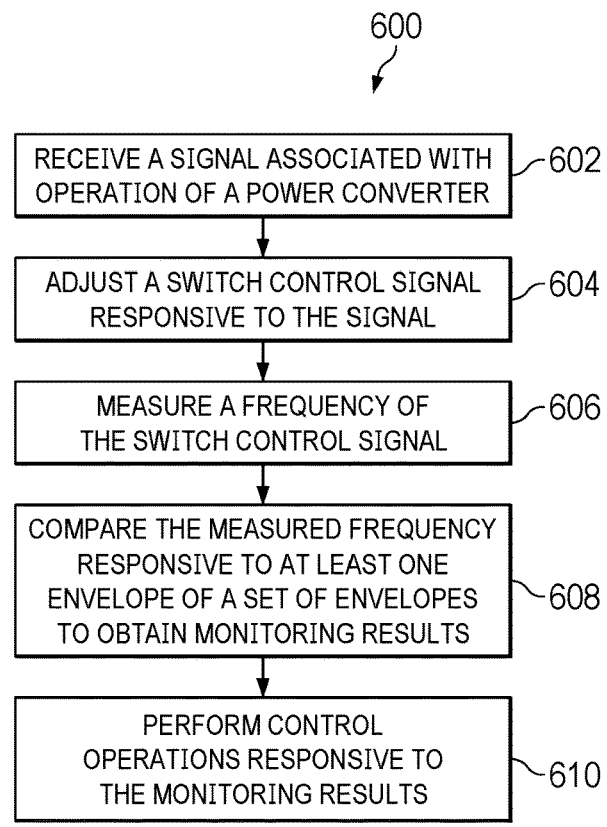
FIG. 6 is a flowchart showing an example power converter control method.

FIG. 6 is a flowchart showing example power converter control method 600. The method 600 may be performed, for example, by the IC 130 of FIG. 1, the MCU 140 in FIG. 1, or the MCU 140A in FIG. 3. As shown, the method 600 includes receiving sense signals at block 602. At block 604, a switch control signal (e.g., one or more of SWITCH_CSs) is adjusted responsive to the sense signals. At block 606, a frequency of the switch control signal(s) is measured. At block 608, the measured frequency is compared responsive to at least one envelope of a set of envelopes to obtain monitoring results. At block 610, control operations are performed responsive to the monitoring results.

In some examples, the control operations of block 610 include adjusting the PWM control signal responsive to a first control loop and a second control loop, the second control loop responsive to the monitoring results, and the first control loop responsive to the sense signals and slower than the second control loop. In some examples, the control operations of block 610 include generating a DMA request responsive to the monitoring results. In some examples, the monitoring results of block 608 include detecting whether a frequency drift is greater than a threshold, and the control operations of block 610 include generating the DMA request responsive to the detected frequency drift being greater than the threshold. In some examples, the threshold is based on the outer envelope.

In some examples, the MCU is configured to program frequency ranges of the inner and outer envelopes. In some examples, the control operations of block 610 include: a first control operation responsive to the monitoring results indicating a breach of the inner envelope by the measured frequency; and a second control operation responsive to the monitoring results indicating a breach of the outer envelope by the measured frequency. In some examples, the MCU is configured to predict a resonant converter gain trajectory responsive to the monitoring results of block 608, and the control operations of block 610 are based on the predicted resonant converter gain trajectory. In some examples, the MCU is configured to predict the resonant converter gain trajectory using Kalman filtering.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component and/or a conductor.

A circuit or device described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

What is claimed is:

1. A circuit comprising:
   a microcontroller having a first terminal and a second terminal, the microcontroller configured to:
   receive a signal associated with a power converter at the first terminal;
   adjust a switch control signal at the second terminal responsive to the signal;
   measure a frequency of the switch control signal;
   compare the measured frequency responsive to at least one envelope of a set of envelopes to obtain monitoring results, the set of envelopes including an inner envelope and an outer envelope; and
   perform control operations responsive to the monitoring results.

2. The circuit of claim 1, wherein the control operations include adjusting the switch control signal using a first control loop and a second control loop, the second control loop responsive to the monitoring results, and the first control loop responsive to the signal associated with the power converter and slower than the second control loop.

3. The circuit of claim 1, wherein the control operations include generating a direct memory access (DMA) request responsive to the monitoring results.

4. The circuit of claim 3, wherein the monitoring results include detecting whether a frequency drift is greater than a threshold, and the control operations include generating the DMA request responsive to the detected frequency drift being greater than the threshold.

5. The circuit of claim 4, wherein the threshold is based on the outer envelope of the set of envelopes.

6. The circuit of claim 1, wherein the microcontroller is configured to program frequency ranges of the set of envelopes.

7. The circuit of claim 1, wherein the control operations include:
a first control operation responsive to the monitoring results indicating a breach of the inner envelope of the set of envelopes by the measured frequency; and
a second control operation responsive to the monitoring results indicating a breach of the outer envelope of the set of envelopes by the measured frequency.

8. The circuit of claim 1, wherein the microcontroller is configured to predict a resonant converter gain trajectory responsive to the monitoring results, and the control operations are based on the predicted resonant converter gain trajectory.

9. The circuit of claim 8, wherein the microcontroller is configured to predict the resonant converter gain trajectory using Kalman filtering.

10. A microcontroller comprising:
a processor configured to:
receive a signal associated with a power converter; and
provide a switch control signal responsive to the signal; and
a waveform analyzer in communication with the microcontroller and configured to:
measure a frequency of the switch control signal; and
compare the measured frequency responsive to a set of envelopes that includes an inner envelope and an outer envelope to obtain monitoring results.

11. The microcontroller of claim 10, wherein the processor is configured to adjust the switch control signal using a first control loop and a second control loop, the second control loop responsive to the monitoring results, and the first control loop responsive to the signal associated with operation of the power converter and slower than the second control loop.

12. The microcontroller of claim 10, wherein the waveform analyzer is configured to update or shift the inner envelope without intervention of the processor responsive to the monitoring results.

13. The microcontroller of claim 12, wherein the waveform analyzer is configured to:
detect whether a frequency drift is greater than a threshold responsive to the monitoring results; and
generate a direct memory access (DMA) request responsive to the detected frequency drift being greater than the threshold.

14. The microcontroller of claim 10, wherein the waveform analyzer is configured to generate an interrupt to the processor responsive to the monitoring results.

15. The microcontroller of claim 10, wherein the processor is configured to program frequency ranges of the inner and outer envelopes.

16. The microcontroller of claim 10, wherein the waveform analyzer is configured to:
perform a first control operation responsive to the monitoring results indicating a breach of the inner envelope by the measured frequency; and
a second control operation responsive to the monitoring results indicating a breach of the outer envelope by the measured frequency.

17. The microcontroller of claim 10, wherein the waveform analyzer is configured to:
predict a resonant converter gain trajectory responsive to the monitoring results; and
perform a control operations responsive to the predicted resonant converter gain trajectory.

18. A system comprising:
a power converter; and
a microcontroller coupled to power converter and configured to:
receive a signal associated with the power converter;
adjust a switch control signal responsive to the signal;
measure a frequency of the switch control signal;
compare the measured frequency responsive to at least one envelope of a set of envelopes to obtain monitoring results; and
perform control operations responsive to the monitoring results,
wherein the power converter is a resonant converter, the microcontroller is configured to predict a resonant converter gain trajectory responsive to the monitoring results, and the control operations are based on the predicted resonant converter gain trajectory.

19. The system of claim 18, wherein the microcontroller is configured to adjust the switch control signal using a first control loop and a second control loop, the second control loop responsive to the monitoring results, and the first control loop responsive to the signal associated with the power converter and slower than the second control loop.

20. The system of claim 18, wherein the set of envelopes includes an inner envelope and an outer envelope.

* * * * *